United States Patent
Goyins et al.

(10) Patent No.: US 7,339,563 B1
(45) Date of Patent: Mar. 4, 2008

(54) HIGH PERFORMANCE SWITCHABLE POLARIZERS FOR OPTICAL PROJECTION DISPLAYS AND CIRCUITS FOR DRIVING THE POLARIZERS

(75) Inventors: Gregg S. Goyins, Rocklin, CA (US); Robert J. Lawton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 09/497,021

(22) Filed: Feb. 1, 2000

(51) Int. Cl.
*G09G 3/36* (2006.01)
(52) U.S. Cl. .................................. 345/87; 345/204
(58) Field of Classification Search ............... 345/87, 345/32, 101, 102, 88, 38, 40, 204; 349/16, 349/18, 119, 78, 97, 196, 193, 197, 20, 21, 349/72, 161; 359/498, 499; 9/19–55, 78, 9/80, 82, 97
See application file for complete search history.

(56) References Cited

U.S. PATENT DOCUMENTS

| | | | | |
|---|---|---|---|---|
| 3,410,999 A | * | 11/1968 | Fergason et al. | 349/21 |
| 3,963,310 A | * | 6/1976 | Giallorenzi et al. | 349/196 |
| 4,603,946 A | * | 8/1986 | Kato et al. | 349/195 |
| 4,692,779 A | * | 9/1987 | Ando et al. | 347/123 |
| 4,723,835 A | * | 2/1988 | Franklin | 349/161 |
| 4,799,770 A | * | 1/1989 | Kahn et al. | 349/20 |
| 5,080,467 A | * | 1/1992 | Kahn et al. | 349/161 |
| 5,694,191 A | * | 12/1997 | Strathman et al. | 349/161 |
| 5,754,155 A | * | 5/1998 | Kubota et al. | 345/98 |
| 5,886,763 A | * | 3/1999 | Wolkowicz et al. | 349/161 |
| 6,128,053 A | * | 10/2000 | Brandt et al. | 349/72 |
| 6,130,731 A | * | 10/2000 | Andersson et al. | 349/77 |
| 6,198,523 B1 | * | 3/2001 | Helbing | 349/171 |
| 6,317,178 B1 | * | 11/2001 | Brandt et al. | 349/72 |

* cited by examiner

*Primary Examiner*—Richard Hjerpe
*Assistant Examiner*—Kevin M Nguyen

(57) ABSTRACT

The invention is directed towards high performance switchable polarizers for optical projection displays. One embodiment of the invention is a switchable polarizer with (1) two conductive electrodes and (2) a liquid crystal material that is positioned between the two conductive electrodes. The electrodes apply a uniform electric field across the liquid crystal material when one of the electrodes is placed at a first potential and other electrode is placed at a second potential different from the first potential. These two electrodes also heat the liquid crystal material when they conduct current. When equal currents are drawn through the electrodes, the electrodes apply a uniform electric field across the liquid crystal during a heating operation.

14 Claims, 7 Drawing Sheets

HIGH PERFORMANCE SWITCHABLE POLARIZERS FOR OPTICAL PROJECTION DISPLAYS AND CIRCUITS FOR DRIVING THE POLARIZERS

The present invention is directed towards high performance switchable polarizers for optical projection displays, and circuits for driving these switchable polarizers.

BACKGROUND OF THE INVENTION

Optical projection displays often use polarizing elements to change the polarization of the light that they receive. One type of polarizing element is an active polarizing switch, which is also called a switchable polarizer. A switchable polarizer receives electrical signals that control how the polarizer changes the polarization of the light.

FIG. 1 presents one prior art switchable polarizer. This polarizer 100 includes two layers of glass 105 and 110, two transparent indium-tin-oxide ("ITO") electrodes 115 and 120, a layer of liquid crystal material 125, and two contacts 130 and 135. The liquid crystal material 125 changes the polarization of the incident light based on a variety of criteria. These criteria include the structure and orientation of the liquid crystal material 125 as well as the potential difference across this material.

The potential difference across this material 125 is a primary influence on its polarization. This is because the molecular orientation of the liquid crystal material 125 rotates when an electric field is applied across it. This rotation, in turn, modifies how this material changes the polarization of the light passing through it. A potential difference is applied across the liquid crystal material by placing the first electrode 115 (via contact 130) at a first potential ($V_1$) and placing the second electrode 120 (via contact 135) at a second potential ($V_2$) that is different from the first potential. Hence, applying two different voltages to the electrodes 115 and 120 modifies how the liquid crystal material 125 changes the polarization of the light.

The operation of switchable polarizer 100 is also partially dependent on the temperature. Specifically, the angle that this switch rotates the polarization of the incident light varies with the temperature. Consequently, the temperature of the switchable polarizer needs to be controlled to ensure that it rotates the polarization of the incident light by a precise amount. Otherwise, imprecise polarization by the polarizer 100 will degrade the brightness and contrast of the displayed image.

One prior art solution for controlling the temperature of the switchable polarizer 100 is to glue a heater to the polarizer. This heater controls the temperature of the polarizer. This solution, however, makes the structure of the switchable polarizer somewhat bulky and adds to the expense of this device. This solution also makes it harder to manufacture this device reliably. In addition, this prior art solution results in uneven temperature control since the heater cannot be placed in the optical path.

FIG. 2 presents another prior art solution for controlling the temperature of switchable polarizers. Like the switchable polarizer 100 of FIG. 1, the switchable polarizer 200 of FIG. 2 includes (1) a layer of liquid crystal material 125, (2) two ITO electrodes 115 and 120 that surround the liquid crystal material and establish the electric field across this material, (3) two glass layers 105 and 110, and (4) two contacts 130 and 135.

Polarizer 200, however, also includes (1) a third ITO electrode 205 for heating the polarizer, and (2) a third glass layer 210 for protecting the third ITO layer 205. To generate heat, one end of the third electrode is placed at a third potential (V3) while the other end of this electrode is placed at a fourth potential (V4) different from the third potential. The potential difference across the third electrode 205 (i.e., the ΔV, which equals V3-V4) causes a current (I) to flow through this electrode. The current flow will cause power to dissipate at a rate of $I^2RL$, where R is the resistance of the third ITO electrode per unit length and L is its length. This power is dissipated in form of heat.

This prior art solution has several disadvantages. One disadvantage is that the potential difference across the third ITO layer results in a potential gradient across the switch 200. This potential gradient causes polarization of the light to be non-uniform across the switch.

Another disadvantage of the switch 200 is that the third electrode 205 attenuates the intensity of the light. Each layer of ITO attenuates four to six percent of the light depending on the wavelength of the light. The light is attenuated the most in the blue range, which often is one of the more important color components. The attenuation of the light, in turn, degrades the brightness and contrast of the display system.

Therefore, there is a need in the art for high performance switchable polarizers for optical projection displays. There is also a need for switchable polarizers that have thermal control structures which do not introduce voltage gradients across the polarizers. There is also a need for switchable polarizers with thermal control structures that do not attenuate the intensity of the incident light.

SUMMARY OF THE INVENTION

The invention is directed towards high performance switchable polarizers for optical projection displays. One embodiment of the invention is a switchable polarizer with (1) two conductive electrodes and (2) a liquid crystal material that is positioned between the two conductive electrodes.

The electrodes apply a uniform electric field across the liquid crystal material when one of the electrodes is placed at a first potential and the other electrode is placed at a second potential different from the first potential. These two electrodes also heat the liquid crystal material when they conduct current. When equal currents are drawn through the electrodes, the electrodes apply a uniform electric field across the liquid crystal during a heating operation. The electric field normal to the surface of the two electrodes remains constant even though the potential varies across each electrode.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

The invention is directed towards high performance switchable polarizers for optical projection displays, and circuits for driving these polarizers. In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 3:
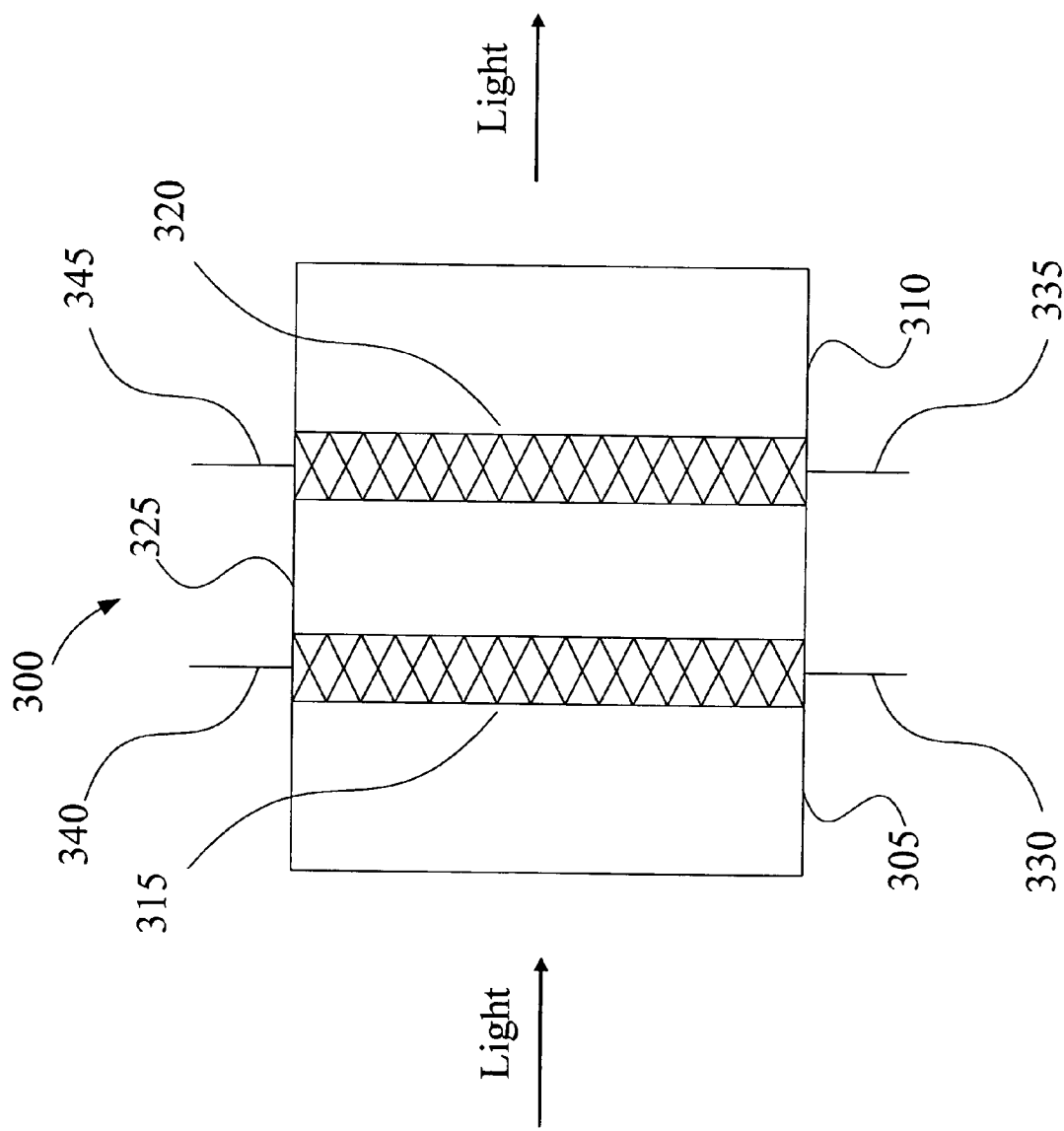
FIG. 3 presents one embodiment of the invention's switchable polarizer.

FIG. 3 presents one embodiment of the invention. This embodiment is a high performance switchable polarizer 300 for use in an optical projection display. As further described below, this switchable polarizer 300 is heated by using the same pair of electrodes that apply electric fields across the liquid crystal material of the switch.

Switchable polarizer 300 includes two substrate layers 305 and 310, two transparent electrodes 315 and 320, a layer of liquid crystal material 325, and four contacts 330, 335, 340, and 345. Some embodiments of the polarizer 300 use indium-tin-oxide ("ITO") electrodes, a surface stabilized ferroelectric liquid crystal ("SSFLC") material, glass substrate layers, and ITO contacts. Other embodiments of the polarizer 300, however, use other conductive electrodes, liquid crystal material, protective substrates, and contacts.

Figure 1:
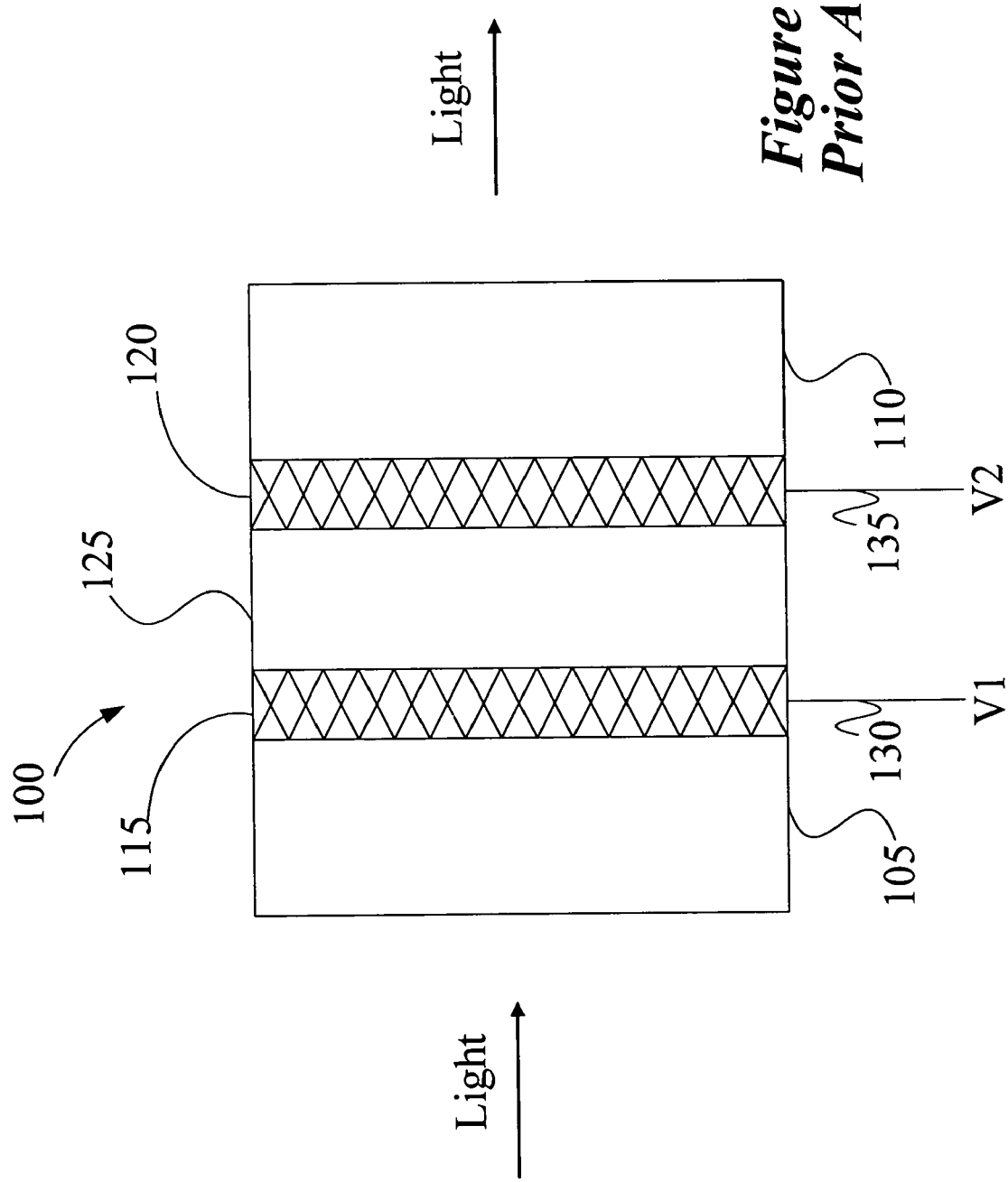
FIG. 1 presents one prior art switchable polarizer.
Figure 2:
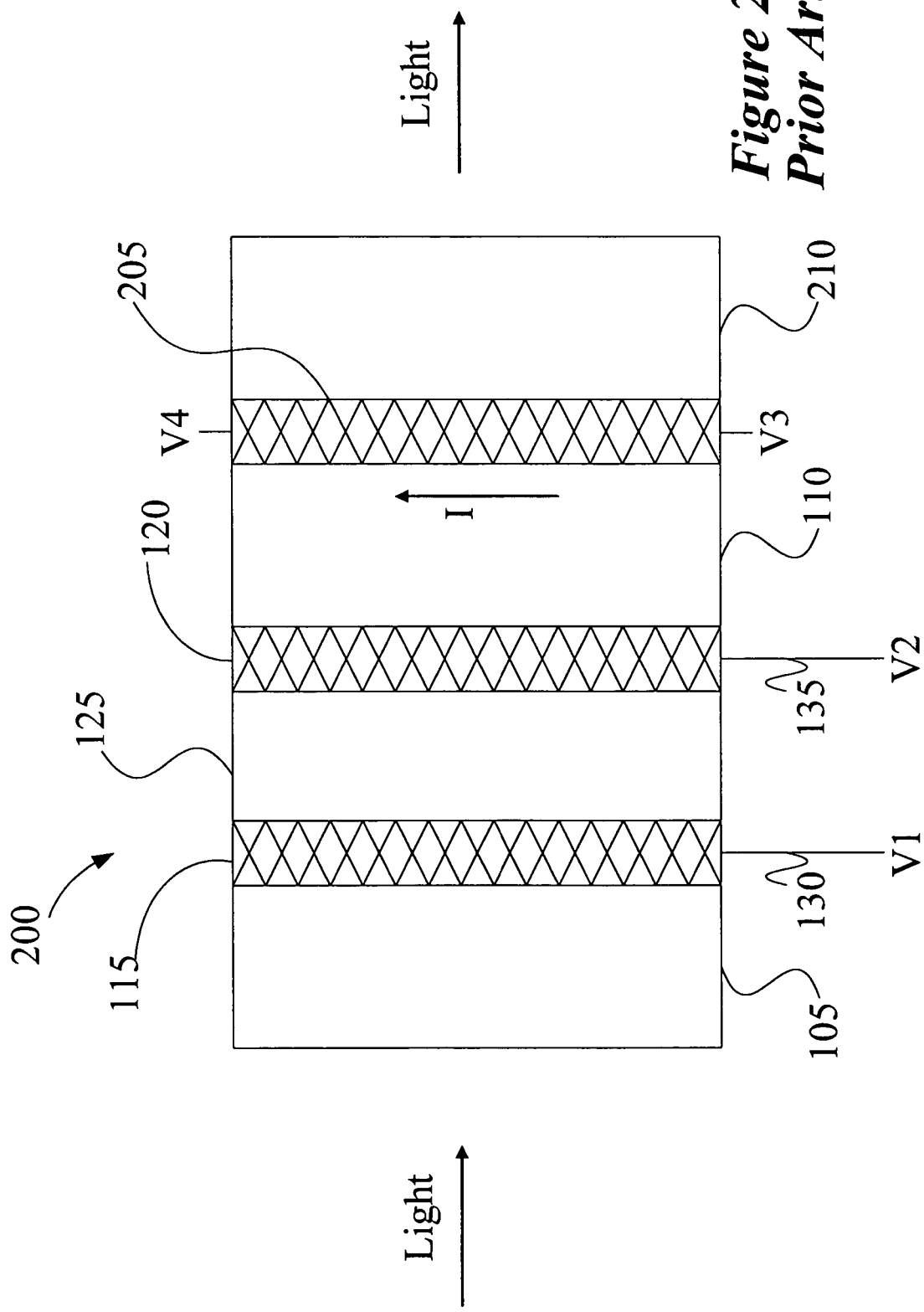
FIG. 2 presents another prior art switchable polarizer.

Polarizer 300 is constructed by using known processes for constructing switchable polarizers. For instance, some embodiments are constructed by using essentially the same process that is used for constructing polarizer 100 of FIG. 1. However, the process for constructing polarizer 300 also includes a step for attaching contacts 340 and 345 to electrodes 315 and 320. These contacts are affixed to the electrodes by using the same techniques that are used for attaching contacts 130 and 135 to electrodes 115 and 120 of FIG. 1.

The electrodes, contacts, and liquid crystal material perform the polarization and heating operations of the polarizer 300, while the substrate layers 305 and 310 insulate and protect these materials during these operations. In particular, the liquid crystal material 325 changes the polarization of the light passing through the switch based on a variety of criteria. Two such criteria are the structure and orientation of the liquid crystal material 325.

Two other criteria are the magnitude and direction of the electric field that is applied across the liquid crystal material 325. The optical axis of the liquid crystal material 325 rotates when an electric field is applied across it or when an existing electric field across it is changed. This rotation, in turn, modifies how the liquid crystal material changes the polarization of the light passing through it.

An electric field is placed across the liquid crystal by applying different potentials to the electrodes 315 and 320 through contacts 330 and 335. A variety of waveforms can drive these electrodes to apply a variety of different electric fields across the liquid crystal material. Changing the driving potentials on electrodes 315 and 320 changes the electric field applied across the liquid crystal material 325 and thereby changes the operation of polarizer 300.

Electrodes 315 and 320 also perform the heating operation of polarizer 300. In particular, to heat the polarizer 300, equal currents are drawn through electrodes 315 and 320 via contacts 330, 335, 340, and 345. The heating and switching operations can be performed concurrently because, even during a heating operation, the potential difference between electrodes 315 and 320 is uniform along the length and width of these electrodes. The heating and switching operations of polarizer 300 are further described below by reference to FIGS. 5 and 6.

Figure 4:
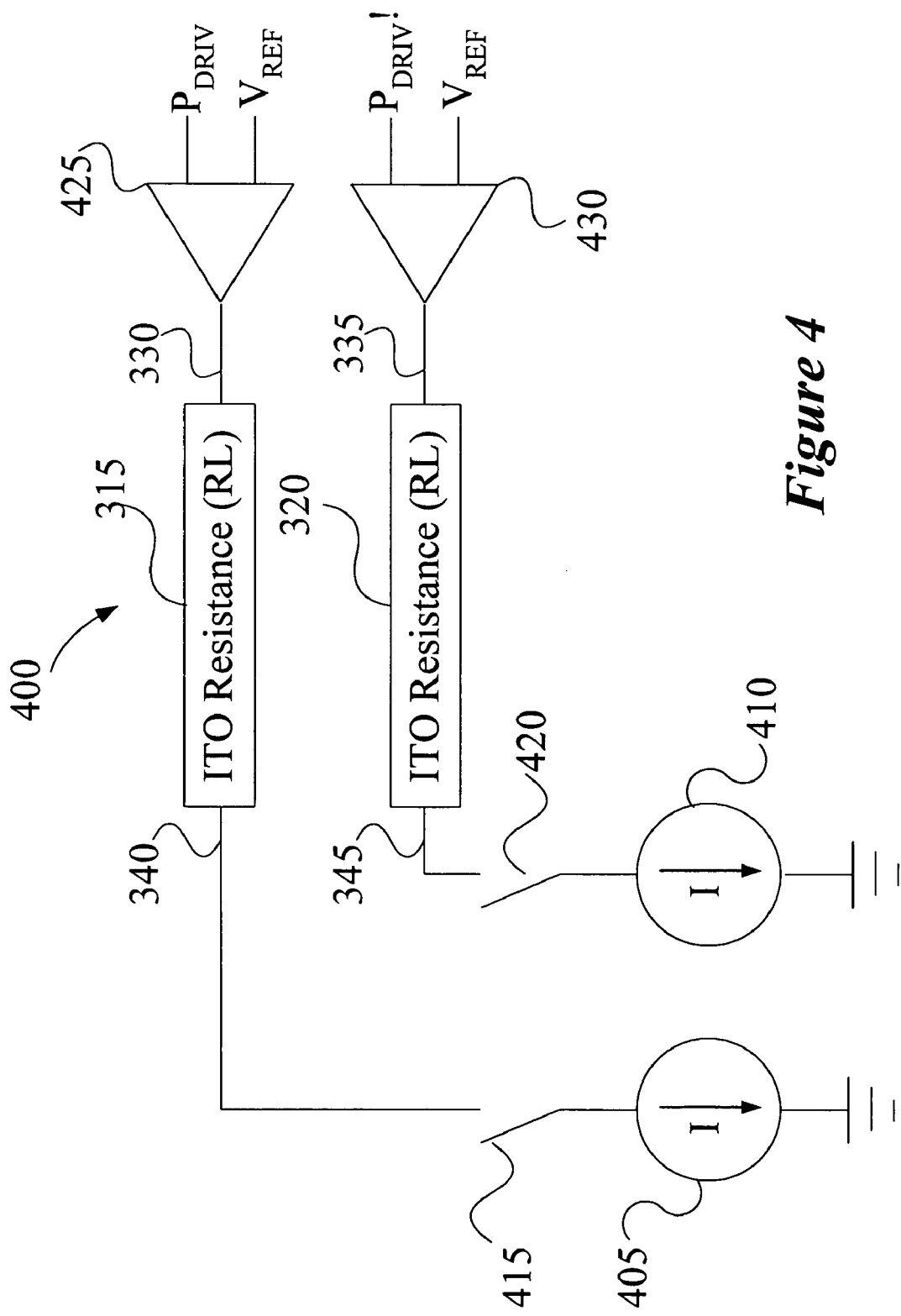
FIG. 4 presents one embodiment of the invention's driving circuit for driving the switchable polarizer of FIG. 3.

FIG. 4 presents the circuit that is used to drive electrodes 315 and 320 in some embodiments of the invention. This circuit 400 is formed by two current sources 405 and 410, two switches 415 and 420, the resistance of the two electrodes 315 and 320, and two programmable gain amplifiers 425 and 430. In FIG. 4, the resistance of each electrode is expressed as the resistance of the electrode material per unit length (R) multiplied by the electrode's length (L).

The current sources 405 and 410 connect to the electrodes 315 and 320 respectively through switches 415 and 420 and contacts 340 and 345, while the amplifiers 425 and 430 connect to the electrodes 315 and 320 respectively through contacts 330 and 335. The current sources 405 and 410 are constant current sources that draw an equal amount of current (I) through the electrodes 315 and 320 when switches 415 and 420 are closed.

The programmable gain amplifiers 425 and 430 operate as buffers that supply the necessary voltage signals to electrodes 315 and 320 to sustain the currents (I) being drawn through the electrodes by current sources 405 and 410. Each amplifier receives a reference voltage ($V_{REF}$) that determines the magnitude of the output of the amplifier. The amplifiers also receive polarization-driving voltages ($P_{DRIV}$ and its bipolar or digital complement $P_{DRIV}$!) that determine the polarity of the output of the amplifiers.

The polarization-driving voltages are not directly applied to the electrodes 315 and 320 because the polarization-driving voltages might not be sufficient to sustain the currents (I) drawn through these electrodes by current sources 405 and 410. Hence, these signals are supplied to the programmable gain amplifiers 425 and 430, which provide the voltages (i.e., current drives) necessary to sustain the currents (I) that current sources 405 and 410 draw through the electrodes 315 and 320. In some embodiments of the invention, the amplifiers operate as symmetric drive buffers that produce symmetric bipolar drive signals and thereby drive one electrode to a positive potential (e.g., $+V_{DRIV}$) and drive the other electrode to an equal-magnitude negative potential (e.g., $-V_{DRIV}$).

Figure 5:
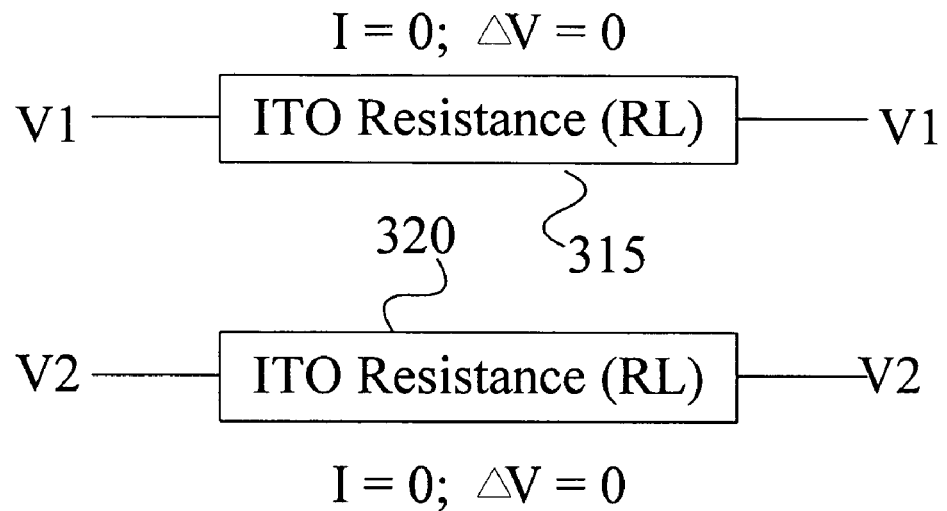
FIGS. 5 and 6 present circuit representations of the electrodes of the switchable polarizer of FIG. 3, for two operational modes of this polarizer.
Figure 6:
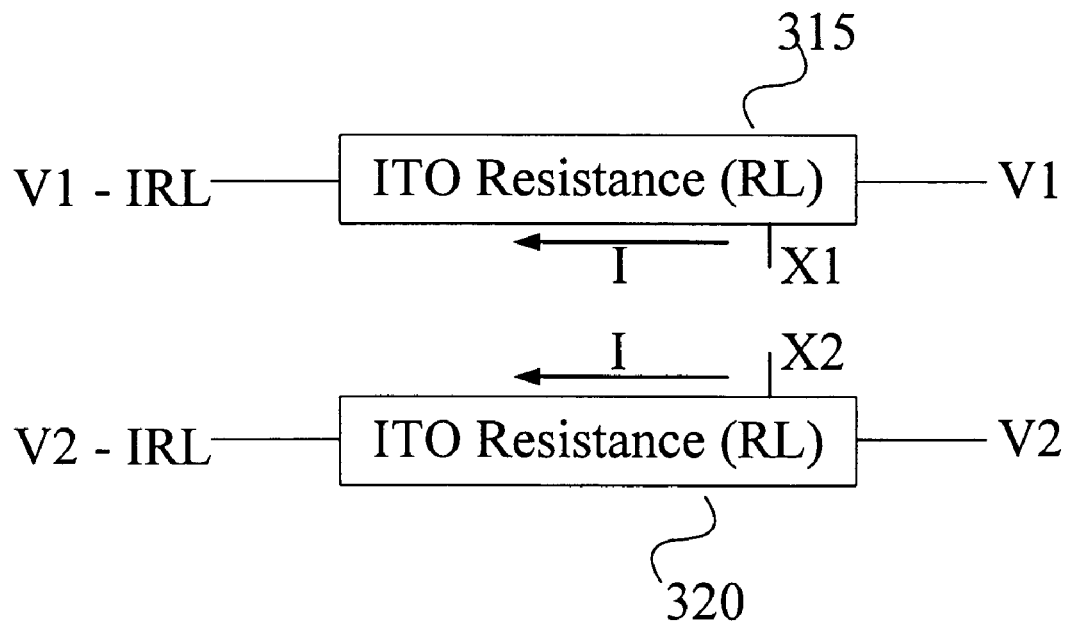

The drive circuit 400 drives the electrodes 315 and 325 in one of two operational modes, which FIGS. 5 and 6 illustrate. FIG. 5 illustrates the first mode of operation when the electrodes apply an electric field across the liquid crystal material but do not heat this material. FIG. 6 illustrates the second mode of operation when the electrodes not only apply an electric field across the liquid crystal material but also heat it.

As shown in FIG. 5, during the first operational mode, the amplifier 425 places the first electrode 315 at a first potential ($V_1$) and the amplifier 430 places the second electrode 320 at a second potential ($V_2$) that is different from the first potential. Also, during this mode, the switches 415 and 420 are opened so that current sources 405 and 410 draw no current through the electrodes. Hence, there is no voltage drop across either electrode during a non-heating operation, because no current flows through the electrodes in this mode.

The potential difference between the electrodes is uniform along the length and width of the electrodes. This potential difference is equal to difference between the voltages applied to the first and second electrodes (i.e., it is equal to V1-V2). Even in the embodiments of the invention that alternately switch the potential on these plates, the potential difference between the electrodes remains uniform along the length and width of the electrodes. Thus, the driving voltages do not create a voltage gradient across the polarizer 300 during the first operational mode.

FIG. 6 explains the second operational mode. During this mode, the driving circuit 400 drives the electrodes not only to establish an electric field across the liquid crystal but also to heat the polarizer. During this mode, the switches 415 and 420 are closed to allow the current sources 405 and 410 to draw equal currents (I) through the electrodes. The programmable-gain amplifiers 425 and 430 supply the necessary voltages to electrodes 315 and 320 to sustain these currents (I).

The currents (I) drawn through the electrodes cause the electrodes to dissipate power, which translates into heat. The thermal energy dissipated through each electrode is $I^2RL$, and the combined thermal energy of both electrodes is $2*I^2RL$. Hence, drawing currents through the electrodes heats the polarizer 300. Driver circuit 400 can control the temperature of the polarizer by selectively drawing currents through the electrodes through the selective opening and closing of switches 415 and 420.

The equal currents (I) that are drawn through the electrodes also ensure that the potential difference between the electrodes is uniform along the length and width of the electrodes. As shown in FIG. 6, the flow of current through each electrode results in a voltage drop across the electrode.

At any point on either electrode (such as point X1 on electrode 315 and X2 on electrode 320), the potential equals the voltage that is supplied by the electrode's corresponding amplifier (i.e., equals V1 or V2) minus the product of the current (I) multiplied by the unit resistance (R) multiplied by the length ($L_{X1}$ or $L_{X2}$) of the electrode up to that point. Equation (A) mathematically defines this relationship for electrode 315, while equation (B) mathematically defines this relationship for electrode 320.

$$V_{X1} = V1 - (I*R*L_{X1}); \quad (A)$$

$$V_{X2} = V2 - (I*R*L_{X2}); \quad (B)$$

The potential difference at any directly opposing points on the electrodes is always equal to $V_1 - V_2$. This uniform potential difference is mathematically explained by the equations (C)-(H).

$$L_{X1} = L_{X2} = L_O; \quad (C)$$

$$V_{X1} = V1 - (I*R*L_O); \quad (D)$$

$$V_{X2} = V2 - (I*R*L_O); \quad (E)$$

$$V_{X1} - V_{X2} = [V1 - (I*R*L_O)] - [V2 - (I*R*L_o)]; \quad (F)$$

$$V_{X1} - V_{X2} = V1 - V2 +; \quad (G)$$

$$V_{X1} - V_{X2} = V1 - V2 \quad (H)$$

Equation (C) explains that two directly opposing points on the electrodes have the same distance ($L_O$) to the starting end of their respective electrodes. Equation (D) and (E) explain the voltage at points X1 and X2 in terms of the equal distance ($L_O$). Equation (F) explains the voltage difference between opposing points X1 and X2. Equation (G) is a simplified version of equation (F). Equation (G) shows that the terms associated with the voltage drops across the electrodes cancel each other out. Equation (H) then shows the resulting equation indicating that the potential difference between any two directly opposing points on the electrodes is always uniform and equals V1-V2.

Thus, the driving voltages and heating currents in FIG. 6 do not create a voltage gradient normal to the polarizer 300 during the heating operation (i.e., during the second operational mode). Even in the embodiments of the invention that alternately switch the potential on these plates, the magnitude of the potential difference between the electrodes is uniform and equals V1-V2 during the heating operation.

One of ordinary skill in the art will appreciate the polarizer 300 and driving circuit 400 have numerous advantages. One advantage is that the heating operation of the polarizer 300 does not result in a normal voltage gradient across the polarizer. The uniform potential difference between the electrodes, in turn, allows the polarizer 300 to polarize the light uniformly during heating and non-heating operations.

Another advantage is that polarizer 300 is heated by using the same pair of electrodes that apply the electric field across this electrode. By using one less electrode than prior art polarizer 200, polarizer 300 minimizes the attenuation of the light that occurs as a result of its electrodes, and thereby increases its light throughput.

Figure 7:
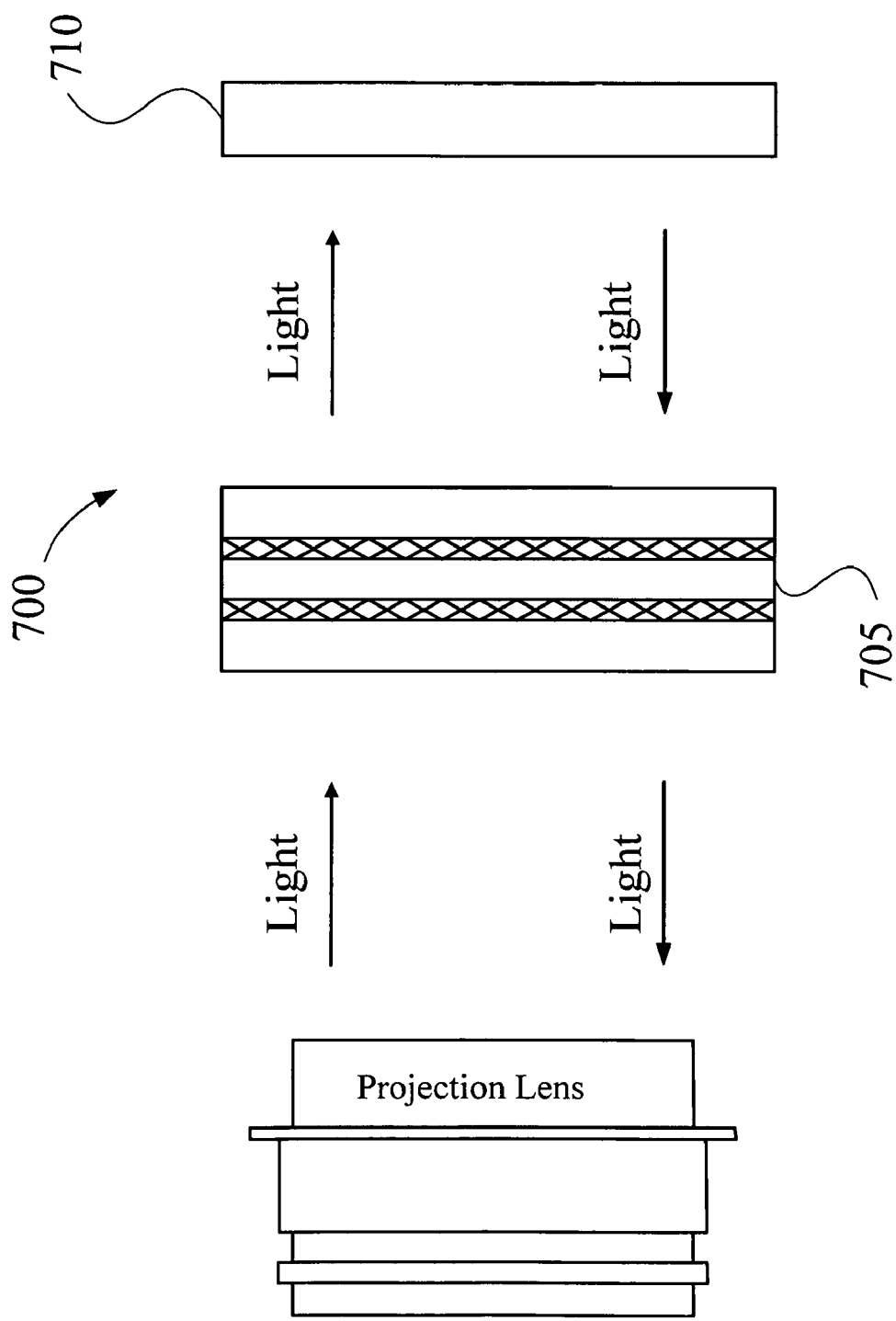
FIG. 7 presents a partial view of a liquid crystal projection display that uses the invention's switchable polarizer as a polarization compensator.

Optical projection displays can use switchable polarizer 300 in a variety of applications. One application for this polarizer is as a high throughput polarization compensator. FIG. 7 presents a partial view of a liquid crystal projection display 700 that uses switchable polarizer 300 as a polarization compensator 705.

Polarization compensator 705 works in conjunction with a liquid crystal light valve 710 to capture light from the light valve when it is operated in a mode called inversion. Light valves are operated in an inversion mode in order to help avoid the "sticking" of individual pixels of the light valve.

Sticking is a commonly recognized problem by designers of liquid crystal display systems. Sticking occurs when a pixel is left energized for an extended period, causing impurities in the liquid crystal surrounding the pixel to migrate. The migration of impurities, in turn, introduces a polarization vector in the liquid crystal at the location of the pixel. This polarization vector then can offset any electric field applied across the pixel, and thereby prevent the pixel from switching. Such a pixel is referred to as a "stuck" pixel.

One way of avoiding sticking is to alternate the bias across each pixel during an inversion period. During the inversion period, however, the image is inverted. Therefore, to recover a positive image during this period, a polarization compensator 705 is used to rotate appropriately the polarization of the light going to and coming from the light valve. In other words, the driving of the polarization compensator 705 and the light valve 710 is synchronized so that these two devices always provide a positive image to the viewer.

Like all switchable polarizers, the operation of a polarization compensator is dependent on the temperature. Hence, the temperature of a polarization compensator needs to be controlled to ensure that it rotates the polarization of the incident light by a precise amount. Otherwise, imprecise polarization by the compensator (1) degrades the image brightness and contrast, and (2) results in flicker from frame to frame.

Switchable polarizer 300 makes an exemplary polarization compensator 705 because the mechanism for controlling its temperature does not adversely influence its polarization operation. In particular, the thermal control structure of compensator 705 will not introduce a voltage gradient across the compensator and it will not attenuate the intensity of the incident light.

Figure 8:
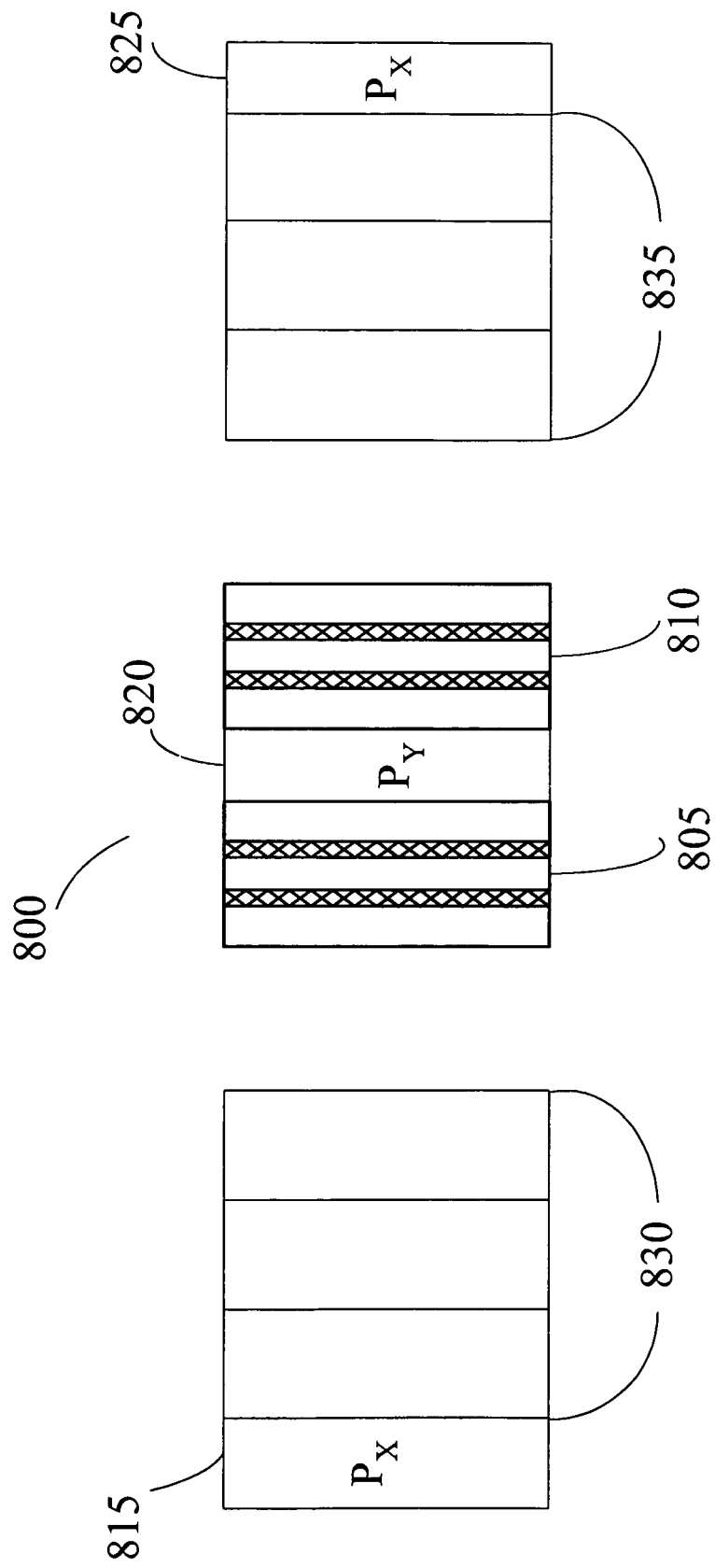
FIG. 8 presents an electronic color switch that uses two switchable polarizers of the invention as its polarizing switches.

Switchable polarizer 300 can also be used in an electronic color switch, such as the one disclosed in U.S. Pat. No. 5,751,384 ("the '384 patent"). FIG. 8 presents an electronic color switch 800, which is similar to the one disclosed in FIG. 23b of the '384 patent. The only difference is that color switch 800 uses the invention's switchable polarizers as polarizing switches 805 and 810.

As shown in FIG. 8, this color switch 800 includes (1) three passive polarizing filters 815, 820, and 825 for filtering out particular polarizations of light; (2) two retarders 830 and 835, each for transmitting a primary additive color along a first direction while retarding its complementary subtractive color along a second orthogonal direction; and (3) two polarizing switches 805 and 810 for selectively rotating the additive and subtractive color light that they receive.

Color filter 800 receives unpolarized white light at the input of the polarizing filter 815. Based on the state of the polarizing switches 805 and 810, color filter 800 outputs X-polarized light that is either black or is one of the three primary additive colors, red, green, or blue.

Using the invention's switchable polarizer as the polarizing switches 805 and 810 is advantageous in a number of ways. When prior art switchable polarizers are used as the polarizing switches of a color switch, the temperature dependence of the prior art polarizing switches causes the polarizing switches to rotate imprecisely the polarization of the light. This imprecise polarization, in turn, causes the other components of the color switch to filter out a portion of the light that is supposed to be transmitted. Hence, the imprecise polarization of the prior art polarizing switches reduces the brightness and contrast of the prior art projection displays.

This problem can be avoided, however, by using the invention's switchable polarizer for switches 805 and 810. The heating mechanism of the invention's switchable polarizers 805 and 810 maintains the temperature of this polarizer at a precise value, and thereby allows the polarizing switches 805 and 810 to rotate precisely the polarization of the light. In addition, the heating mechanism will neither introduce a voltage gradient across the switch nor attenuate the intensity of the incident light.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A switchable polarizer for optical projection displays, said switchable polarizer comprising:
   a first electrode having a first set of contacts;
   a second electrode having a second set of contacts; and
   a layer of liquid crystal material positioned between the first and second electrodes;
   wherein the first electrode conducts current between said first set of contacts to heat the polarizer, and wherein the second electrode conducts current between said second set of contacts to heat the polarizer.

2. The switchable polarizer of claim 1, wherein the current passing through the first electrode is equal in magnitude to the current passing through the second electrode.

3. The switchable polarizer of claim 2, wherein the currents passing through the first and second electrodes are constant.

4. The switchable polarizer of claim 2, wherein during a heating operation, the first and second electrodes apply a uniform electric field across the liquid crystal material.

5. The switchable polarizer of claim 1, wherein no current passes through the first and second electrodes when the electrodes are not heating the polarizer.

6. The switchable polarizer of claim 1, wherein during a non-heating operation of the polarizer, no current passes through either electrode, and the first electrode is at a first potential and the second electrode is at a second potential different from the first potential.

7. The switchable polarizer of claim 1, wherein the first and second electrodes are transparent electrodes.

8. The switchable polarizer of claim 1, wherein the first electrode receives a first voltage signal and the second electrode receives a second voltage signal.

9. The switchable polarizer of claim 8, wherein the first and second voltage signals are alternating signals.

10. The switchable polarizer of claim 9, wherein the first and second voltage signals are symmetrically opposite bipolar signals.

11. The switchable polarizer of claim 1, wherein the polarizer serves as a polarization compensator in an optical projection display.

12. The switchable polarizer of claim 1, wherein the polarizer is a polarizing switch of an electronic color switch.

13. A method of driving a switchable polarizer in one of two modes, the switchable polarizer having first and second electrodes and a liquid crystal material between the electrodes, wherein during a first driving mode, the electrodes heat the liquid crystal material, while during the second driving mode, the electrodes do not heat the liquid crystal material, said method comprising:
   drawing equal currents through the first and second electrodes during the first driving mode, wherein the drawing of currents through the electrodes includes coupling the electrodes to two current sources; and
   applying a first voltage signal to the first electrode and a second voltage signal to the second electrode during both the first and second driving modes, the first and second voltage signals sustaining the currents drawn through the first and second electrodes during the first driving mode, wherein the applying of the voltage signals to the electrodes includes coupling each electrode to an output of an amplifier.

14. The method of claim 13, wherein the applying of the voltage signals to the electrodes includes applying first and second voltage signals that are alternating signals.

* * * * *

UNITED STATES PATENT AND TRADEMARK OFFICE
CERTIFICATE OF CORRECTION

| | | |
|---|---|---|
| PATENT NO. | : 7,339,563 B1 | Page 1 of 1 |
| APPLICATION NO. | : 09/497021 | |
| DATED | : March 4, 2008 | |
| INVENTOR(S) | : Gregg S. Goyins et al. | |

It is certified that error appears in the above-identified patent and that said Letters Patent is hereby corrected as shown below:

In column 5, line 62, in equation G, delete "$V_{X1}-V_{X2} = V1-V2+$;" and insert -- $V_{X1}-V_{X2} = V1 - \cancel{(I*R*L_e)} - V2 + \cancel{(I*R*L_e)}$; --, therefor.

Signed and Sealed this

Eleventh Day of November, 2008

JON W. DUDAS
*Director of the United States Patent and Trademark Office*